United States Patent Office 3,520,678
Patented July 14, 1970

3,520,678
METHOD OF OPERATING BASIC
OXYGEN FURNACE
Louis W. Frech, Gary, Ind., assignor to
United States Steel Corporation
No Drawing. Filed Dec. 12, 1967, Ser. No. 689,819
Int. Cl. C21c 5/32; G21n 29/00
U.S. Cl. 75—60                                    3 Claims

ABSTRACT OF THE DISCLOSURE

An improvement in the method of controlling basic oxygen furnace operation in which scrap metal is part of the charge thereto and oxygen is blown therein which comprises sensing the vibrations of the furnace to determine when the scrap metal is melted, determining the temperature of the metal in the furnace and adjusting the duration of the oxygen flow in response thereto.

---

This invention relates to oxygen steelmaking. More particularly, the invention relates to an improved method for controlling the oxygen steelmaking operation. In accordance with the method of the invention, the end point bath temperature and carbon content of molten steel produced in an oxygen steelmaking furnace may be more closely controlled.

In conventional oxygen steelmaking practices, the amount of oxygen to use in a given heat is precalculated from information about the weight of the hot metal, scrap and lime charge. Calculations have also been made utilizing knowledge of the silicon content of the bath together with the temperature of the bath to determine the amount of oxygen to be used. Adjustments were additionally made on the basis of preceding heats, experience factors, etc. Based on the information from these calculations, oxygen is blown into the vessel for a predetermined period of time after which the oxygen is turned off and the bath temperature measured. Samples may also be taken for carbon analysis. If an adjustment in temperature is required, additional oxygen is blown to increase the temperature, or coolants are added to lower the temperature. This method of charge calculation and furnace control is known generally in the steel industry as "Static Control." In such a method, it is necessary to obtain the best possible balanced charge to have a heat proceeds in a predictable manner to the greatest extent toward the direction of the desired end temperature and carbon content. A disadvantage of the static control methods is that due to systematic and operational errors in sampling, analysis, weighing, metering, etc., as well as other variations in the system not considered in the original calculation, it is possible only to obtain a performance of ±20° F. of the desired end point temperature in about 50% of the heats when this method is used alone.

In some cases, in order to improve on the foregoing Static Control, attempts have been made to use offgas analysis and/or one or more measurements of bath temperature during oxygen blowing. In such cases, adjustments may be made in the lance height or total oxygen flow or coolants may be added in an effort to bring the heat closer to the desired end point temperature. The correction of bath temperature during blowing according to this method is referred to as "Dynamic Control." This system may be used in addition to or as replacement for Static Control to bring the heats closer to the desired end point temperature and carbon content. However, some difficulties may be encountered in offgas analysis due to differences in blowing and other conditions from heat to heat.

A further and basic disadvantage of both old methods involves obtaining a reliable measurement of bath temperature at precisely the right time. This is due to the presence of unmelted scrap in the furnace throughout much of the oxygen blowing period. Samples and analyses based upon information obtained in the presence of unmelted scrap in the furnace may be highly inaccurate.

The present invention provides a more precise method of controlling the oxygen steelmaking furnace which substantially improves upon both Static and Dynamic Control. According to the invention, the vibrations of the oxygen steelmaking furnace are sensed to determine when the scrap metal in the furnace is completely molten. A temperature sample taken at this time provides a means to evaluate the carbon content of the bath and up-date the information used to control the furnace operation. It has been discovered that at the time the scrap is completely melted, the conditions in the furnace will follow very closely to the upper liquidus line of the iron-carbon equillibrium diagram. Thus, a measurement of the temperature will enable an evaluation of the carbon content of the bath at the time of the temperature measurement. This information can then be used to determine the extent of the subsequent oxygen blow necessary to achieve the desired end point temperature and/or bath carbon content. In this way, the oxygen steelmaking practice is made more efficient and the period of time required to produce a heat of steel is shortened.

Once all the scrap has been melted, the bath temperature will rise at a steeper but determinable rate which will be a function of:

(A) specific blowing rates;
(B) lance design;
(C) lance practice; and
(D) the point at which the scrap is melted.

Since (A), (B) and (C) can be selected and controlled, it is only necessary to determine (D) to affect accurate control of the steelmaking practice. The point at which the scrap is melted is determined in accordance with the invention by sensing vibrations of the refining vessel.

It has been observed that the turbulence in the liquid metal bath during oxygen blowing causes the unmelted scrap to shift, bump and tumble against the furnace lining and that this turbulence causes detectable vibrations or vibrations in furnace loadings. In accordance with the invention, a vibration detector or a strain gauge may be used on the furnace support mechanism to detect the presence of unmelted scrap. If the vibration sensing means are connected to a suitable recording chart, it is possible by observation of the tracing to determine whether the scrap metal has been melted. The presence of unmelted scrap is denoted by irregular tracings on the recorder. When scrap is completely molten and the vibrations cease, the curve becomes smoother.

As described above, a strain chart is particularly advantageous because of the direct relation to the turbulence in the unmelted scrap during the oxygen blowing period. Strain charts may be made by loadings on the torque arm in the furnace tilt mechanism. The vibrations in the vessel which are reflected on the strain chart are caused by melting scrap chunks or bundles as they are being reduced to the liquid state. The time required to produce a heat of steel may be materially reduced by practicing the invention.

A typical heat may presently require 18–23 minutes to blow. If oxygen is turned off after 10 minutes of blowing, and the bath is sampled and the temperature measured shortly thereafter, it will be found that the carbon content and temperature when plotted on an iron-carbon equilibrium diagram will produce a point which will fall on or very close to the upper liquids line. If the oxygen blowing is resumed and a continuous measurement is made to detect the point at which all of the scrap has gone into solution, it will be found that this point will usually occur from 2 to 8 minutes before the end of the oxygen blow, depending upon the type of heat to be made. Once the point of the scrap is determined, the oxygen blowing time can be used in determining the need for correction, i.e. blowing period on subsequent heats of that grade of steel.

As an example, if a low carbon steel heat is calculated to have a scrap melting point of 3 minutes before the end of the oxygen blow, and the actual point at which the scrap is melted is detected, in accordance with the invention, to be 6 minutes before the end of the oxygen blowing, the heat may be at too high a temperature when blowing is completed and it may be necessary to add coolants during blowing to control the temperature.

In a similar manner, if all the scrap is not in solution at 3 minutes before the end of the blowing period, the oxygen blowing period can be extended and/or the lance position changed to generate more heat. Further, if a heat requires too drastic an increase in temperature, a different practice may be required or some exothermic addition such as ferrosilicon, etc. can be added.

To insure that the scrap will melt and go into solution at a rate which is in equilibrium with heat generation, some control of size and type of scrap may be desirable. For example, heavy ingot butts will not go into solution very quickly. Similarly, excessive proportions of large slab crops which tend to lie flat on top of each other may result in a high end point temperature and with unmelted scrap unless the melting point of the scrap is determined in accordance with the invention and adjustments made accordingly. Lance orifice geometry, lance height, bath geometry and specific blowing rates may also be controlled within preselected limits to promote the equilibrium melting rate. However, in any case, determining the point at which the scrap is molten in accordance with the invention by sensing vibrations of the vessel will serve to up-date the information used to control the oxygen steelmaking operation.

It is evident from the above that many advantages flow from the practice of the invention. Thus, the end point temperature and carbon content which is required may be more readily attained in greater numbers of heats. Valuable furnace time formerly required to correct heat temperature or carbon after the main oxygen blow may be greatly minimized. In addition, it is evident that the period of time required to produce a heat of steel may be shortened materially when the steelmaking practice is more accurately controlled.

It is apparent from the above that various changes and modifications may be made without departing from the invention. Accordingly, the scope of the invention should be limited only by the appended claims, wherein what is claimed is:

1. An improvement in the method of controlling basic oxygen furnace operation in which scrap metal is part of the charge thereto and oxygen is blown therein, which comprises sensing the vibrations of the furnace to determine when the scrap metal is melted, determining the temperature of the metal in the furnace and adjusting the duration of the oxygen blow in response thereto.

2. An improvement in accordance with claim 1 wherein the vibrations of the furnace are sensed by means of a strain gauge connected to the furnace support mechanism.

3. An improvement in accordance with claim 1 wherein an estimate of carbon content is obtained from said determined temperature of the metal in the furnace.

References Cited

UNITED STATES PATENTS

| | | | |
|---|---|---|---|
| 2,614,645 | 10/1952 | Wilhelm | 73—69 X |
| 3,161,499 | 12/1964 | Percy | 75—60 |
| 3,240,674 | 3/1966 | Ledwidge | 73—69 X |
| 3,372,023 | 3/1968 | Krainer et al. | 75—60 |
| 3,377,158 | 4/1968 | Meyer et al. | 75—60 |

FOREIGN PATENTS

| | | |
|---|---|---|
| 1,422,726 | 1/1965 | France. |

L. DEWAYNE RUTLEDGE, Primary Examiner

G. K. WHITE, Assistant Examiner

U.S. Cl. X.R.

73—69